(12) United States Patent
Marchlewski et al.

(10) Patent No.: US 10,526,023 B2
(45) Date of Patent: Jan. 7, 2020

(54) VEHICLE TAILGATE

(71) Applicant: FORD GLOBAL TECHNOLOGIES, LLC, Dearborn, MI (US)

(72) Inventors: Jack Marchlewski, Saline, MI (US); Joshua R. Hemphill, White Lake, MI (US); Robert Reiners, Grosse Ile, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 15/244,340

(22) Filed: Aug. 23, 2016

(65) Prior Publication Data
US 2018/0057075 A1 Mar. 1, 2018

(51) Int. Cl.
*B62D 33/027* (2006.01)
*B62D 25/10* (2006.01)
*E05B 83/18* (2014.01)

(52) U.S. Cl.
CPC ........ *B62D 33/0273* (2013.01); *B62D 25/10* (2013.01); *E05B 83/18* (2013.01)

(58) Field of Classification Search
CPC ............................ B62D 33/0273; E05B 83/18
See application file for complete search history.

(56) References Cited

U.S. PATENT DOCUMENTS

| | | | | |
|---|---|---|---|---|
| 4,707,016 A | * | 11/1987 | McDonald | B62D 33/0273 296/39.2 |
| 5,169,201 A | * | 12/1992 | Gower | B60R 13/01 296/39.2 |
| 5,498,049 A | * | 3/1996 | Schlachter | B60R 9/00 224/404 |
| 5,732,995 A | * | 3/1998 | Piccariello | B60P 1/435 296/57.1 |
| 5,868,449 A | | 2/1999 | Hitchcock | |
| 5,971,465 A | * | 10/1999 | Ives | B60P 1/435 296/61 |
| 6,199,930 B1 | | 3/2001 | Riley | |
| 6,431,630 B1 | * | 8/2002 | Meinke | B62D 33/0273 296/50 |
| 6,692,055 B2 | * | 2/2004 | Schilling | B60P 1/435 296/26.11 |
| 7,118,153 B2 | * | 10/2006 | Kitayama | B62D 33/0273 296/57.1 |
| 7,413,230 B1 | * | 8/2008 | Sage | B62D 33/0273 296/26.08 |
| 9,308,947 B2 | * | 4/2016 | Kmita | B60R 9/06 |
| 2002/0145300 A1 | * | 10/2002 | Webber | B60P 1/43 296/61 |

(Continued)

*Primary Examiner* — Gregory J Strimbu
(74) *Attorney, Agent, or Firm* — Vichit Chea; Brooks Kushman P.C.

(57) ABSTRACT

A tailgate includes an internal panel, external panel, upper panel, lower panel, latching mechanism, and access panel. The internal and external panels are each secured to the upper and lower panels. A cavity is defined between the upper, lower, internal, and external panels. The latching mechanism is disposed within the cavity and is linked to a handle located on the external panel. The access panel is secured and extends adjacent to the internal panel beyond the upper panel. The cavity is exposed when the access panel is removed.

16 Claims, 3 Drawing Sheets

(56) References Cited

U.S. PATENT DOCUMENTS

| | | | | |
|---|---|---|---|---|
| 2002/0163223 A1* | 11/2002 | Lehmann | ........... | B62D 33/0273 296/180.1 |
| 2003/0075943 A1* | 4/2003 | Kirchhoff | ................. | B60P 3/14 296/26.11 |
| 2004/0084925 A1* | 5/2004 | Ojanen | ................ | B62D 29/008 296/50 |
| 2004/0164580 A1* | 8/2004 | Armstrong | ........... | B62D 33/023 296/50 |
| 2007/0090662 A1* | 4/2007 | Katterloher | .......... | B62D 33/023 296/57.1 |
| 2008/0315608 A1* | 12/2008 | Heller | ...................... | B60P 7/14 296/50 |
| 2015/0375804 A1 | 12/2015 | Gray et al. | | |

* cited by examiner

VEHICLE TAILGATE

TECHNICAL FIELD

The present disclosure relates to tailgate structures for vehicles such as automobiles and trucks.

BACKGROUND

Automobiles, including trucks, may include tailgates that provide access to storage areas such as truck beds.

SUMMARY

A tailgate includes an internal panel, external panel, upper panel, lower panel, latching mechanism, and access panel. The internal and external panels are each secured to the upper and lower panels. A cavity is defined between the upper, lower, internal, and external panels. The latching mechanism is disposed within the cavity and is linked to a handle located on the external panel. The access panel is secured and extends adjacent to the internal panel beyond the upper panel. The cavity is exposed when the access panel is removed.

A tailgate includes an upper panel, internal panel, and an access panel. The internal panel extends toward and is secured to the upper panel at a substantially perpendicular angle. The internal panel defines an opening and terminates at the upper panel. The access panel is removably secured to an outer surface of the internal panel and covers the opening. The access panel extends adjacent to the internal panel beyond the upper panel.

A tailgate includes an internal panel, external panel, upper panel, lower panel, and an access panel. The internal and external panels are each secured to the upper and lower panels. A cavity is defined between the upper, lower, internal, and external panels. The internal panel defines an opening to the cavity. The access panel has a web and a pair of flanges extending in opposing directions from the web. The access panel is removably secured to the internal panel such that one of the pair of flanges covers the opening, the other of the pair of flanges extends beyond the upper panel, and the web extends adjacent to the upper panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
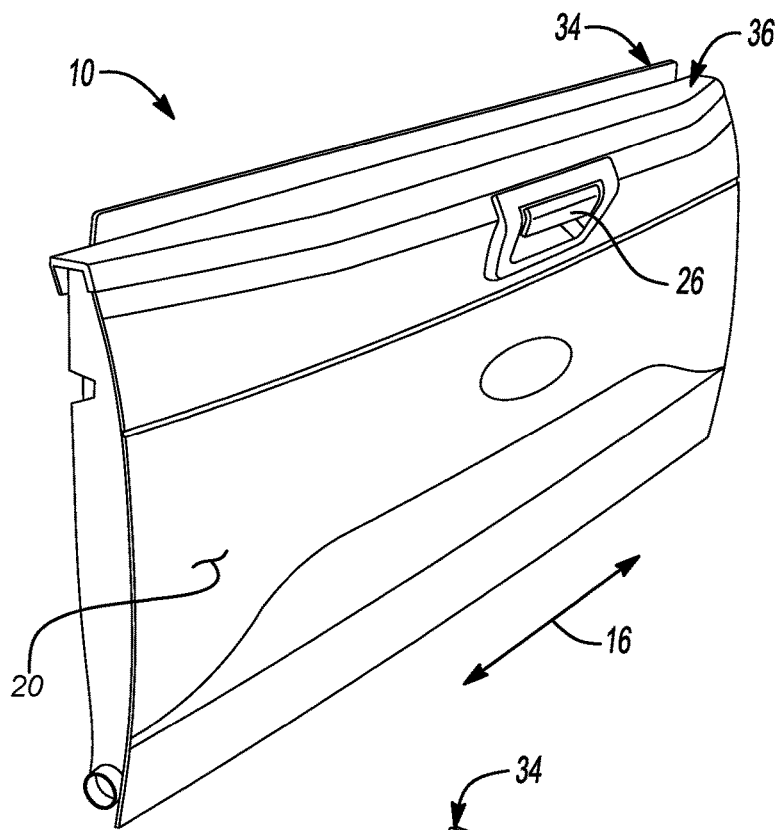
FIG. 1 is a first isometric view of a tailgate illustrating an exterior portion of the tailgate.
Figure 2:
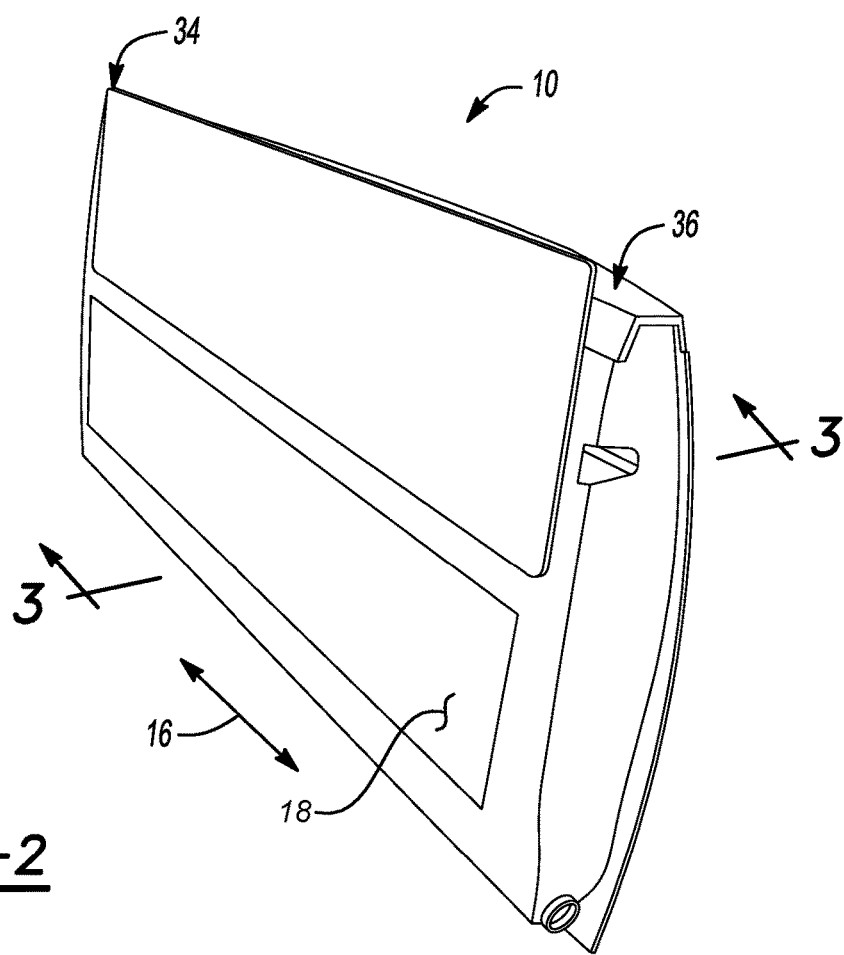
FIG. 2 is a second isometric view of the tailgate illustrating an interior portion of the tailgate.
Figure 3:
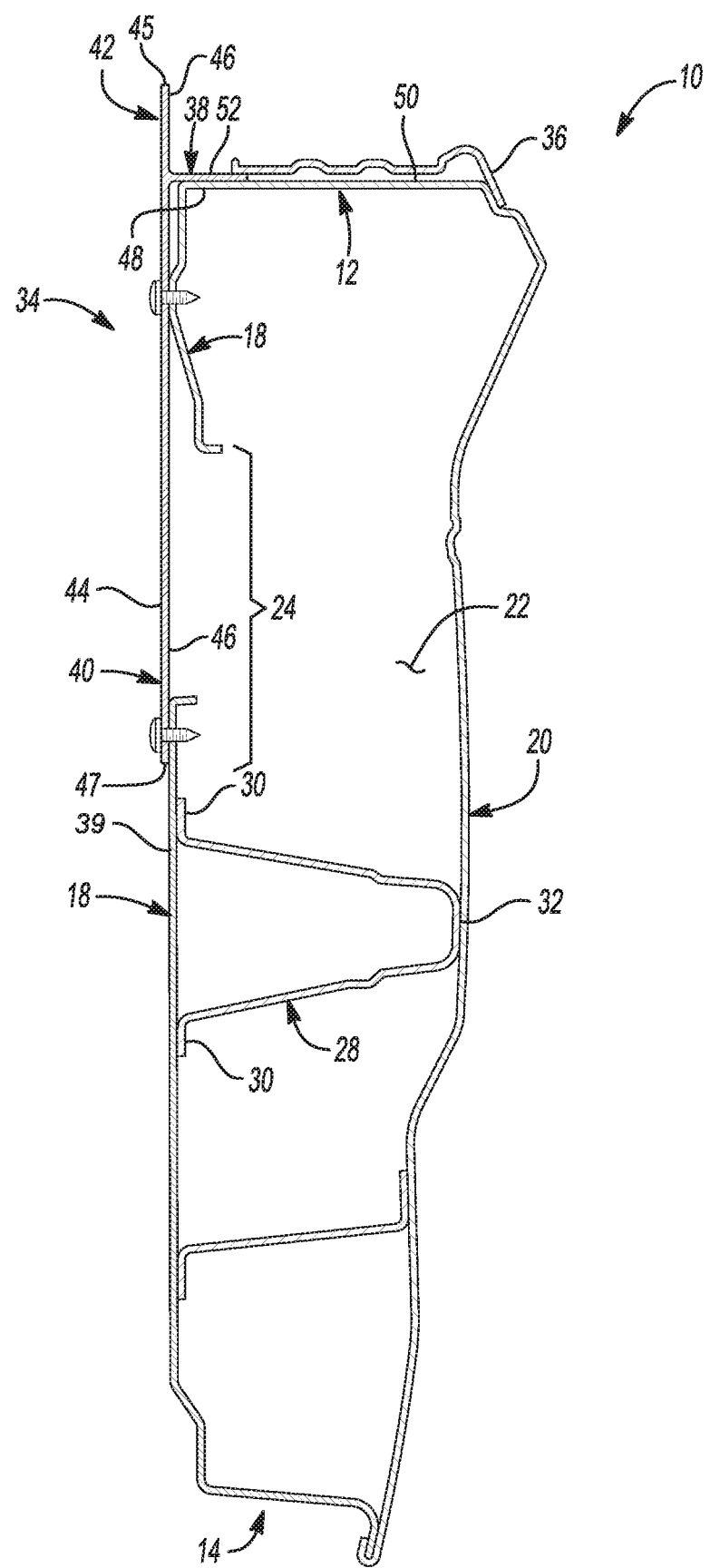
FIG. 3 is a cross-sectional view taken along line 3-3 in FIG. 2.

Referring to FIGS. 1, 2, and 3, a tailgate 10 is illustrated. The tailgate 10 may be a part of a vehicle such as an automobile or truck. The tailgate 10 includes an upper panel 12 and a lower panel 14. The upper panel 12 and the lower panel 14 are spaced apart relative to each other. The upper panel 12 and the lower panel 14 both extend in a transverse direction 16. The tailgate 10 also includes an internal panel 18 and an external panel 20. The internal panel 18 and the external panel 20 are each secured to both the upper panel 12 and the lower panel 14. The internal panel 18 and the external panel 20 (or segments of the internal panel 18 and the external panel 20) may each be secured to the upper panel 12 and/or the lower panel 14 at a substantially perpendicular angle. Substantially perpendicular may include any angle ranging from 80 degrees to 100 degrees. The internal panel 18 may terminate at a first end where the internal panel 18 is joined to the upper panel 12. The internal panel 18 may also terminate at a second end where the internal panel 18 is joined to the lower panel 14. The external panel 20 may terminate at a first end where the external panel 20 is joined to the upper panel 12. The external panel 20 may also terminate at a second end where the external panel 20 is joined to the lower panel 14. A cavity 22 is defined between the upper panel 12, lower panel 14, internal panel 18, and external panel 20. The internal panel 18 may define an opening 24 into the cavity 22.

A door handle 26 may be disposed on the external panel 20. The door handle 26 may be linked to a latching system (or latching mechanism) that locks the tailgate 10 in an up position. Pulling the door handle 26 may unlock the latching system, allowing the tailgate 10 to transition between the up position and a down position. The latching system may include connecting the door handle 26 to one or more latches by a series of linking mechanisms. The linking mechanisms and the one or more latches may be disposed within the cavity 22. A support member 28 may be disposed within the cavity 22 between the upper panel 12 and the lower panel 14. The support member 28 may extend in the transverse direction 16. The support member 28 may be secured to both the internal panel 18 and the external panel 20. The support member 28 may include a pair of flanges 30 that extend from a central plate 32. The pair of flanges 30 may be secured to the internal panel 18 while the central plate 32 is secured to the external panel 20.

The Tailgate 10 may include an access panel 34 and a top cover 36. The access panel 34 may extend adjacent to the internal panel 18. The access panel 34 may also extend beyond the upper panel 12 and/or the top cover 36. The access panel 34 may be removably secured to an outer surface 39 of the internal panel 18. When attached to the internal panel 18 the access panel 34 may cover the opening 24. When the access panel 34 is removed from the internal panel 18 both the opening 24 and the cavity 22 may be exposed. More specifically, the latching system (or any components thereof) may be exposed when the access panel 34 is removed from the internal panel 18.

The access panel 34 may include a web 38 and a pair of flanges (hereinafter referred to as first flange 40 and second flange 42) that extend from the web 38 in opposing directions. The web 38 may extend adjacent to the upper panel 12 when the access panel 34 is secured to the internal panel 18. The first flange 40 and the second flange 42 may extend adjacent to the internal panel 18 when the access panel 34 is secured to the internal panel 18. The first flange 40 may cover the opening 24 when the access panel 34 is secured to the internal panel 18. The second flange 42 may extend beyond the upper panel 12 and/or the top cover 36 when the access panel 34 is secured to the internal panel 18. The web 38 (or portions thereof) may be substantially parallel to the upper panel 12 (or portions thereof) while the first flange 40 and second flange 42 (or portions thereof) may be substantially parallel to the internal panel 18 (or portions thereof). Substantially parallel may include any deviation from parallel that ranges from 0 mm to 5 mm.

The access panel 34 may include a substantially planar or substantially flat exterior surface 44 that may extend beyond the upper panel 12. The access panel 34 may also include an upper edge 45 and a lower edge 47. The substantially flat exterior surface 44 may extend between the upper edge 45 and the lower edge 47. The access panel 34 may also include a substantially flat interior surface 46 that may extend beyond the upper panel 12. Substantially flat may include any deviation from a perfectly flat plane that ranges from 0 mm to 5 mm. The web 38 may extend from the interior surface 46 at a substantially perpendicular angle. Substantially perpendicular may include any angle ranging from 80 degrees to 100 degrees. The web 38 may be secured to the upper panel 12. More specifically, a lower surface 48 of the web 38 may be secured to an outer surface 50 of the upper panel 12. The web 38 may also be secured to the top cover 36. More specifically, an upper surface 52 of the web 38 may be secured to the top cover 36. The top cover 36 may also be secured to the outer surface 50 of the upper panel 12. The substantially flat exterior surface 44 provides a place to rest items when the tailgate 10 is an open position. The substantially flat exterior surface 44 may also be used as a working space when the tailgate 10 is an open position. A portion of the substantially flat interior surface 46 that extends beyond the upper panel 12 and/or the top cover 36 may be used as a clamping surface to secure the position of an item that has been placed on the substantially flat exterior surface 44. A clamp (such as a C-clamp) may engage both the substantially flat interior surface 46 and the item that has been placed onto the substantially flat exterior surface 44 in order to secure the item to the substantially flat exterior surface 44.

The components of the tailgate 10 (including the upper panel 12, lower panel 14, internal panel 18, external panel 20, support member 28, access panel 34, and top cover 36) may be made from any structural material including metals, plastics, or composite materials. Specific materials that the tailgate 10 components may be made from include, but are not limited to, aluminum alloys, steel, magnesium, fiber-reinforced plastics, or any other desirable structural material.

The components of the tailgate 10 (including the upper panel 12, lower panel 14, internal panel 18, external panel 20, support member 28, access panel 34, and top cover 36) that are secured to each other, as described above, may be secured to each other by welds, adhesive, fasteners, or by any other attachment mechanism known by a person of ordinary skill in the art. Some components may be integral to each other (e.g., two panels may be formed by bending a single sheet of material). Fasteners may include bolts, screws, rivets, or any other fastening mechanism known by a person of ordinary skill in the art.

Figure 4:
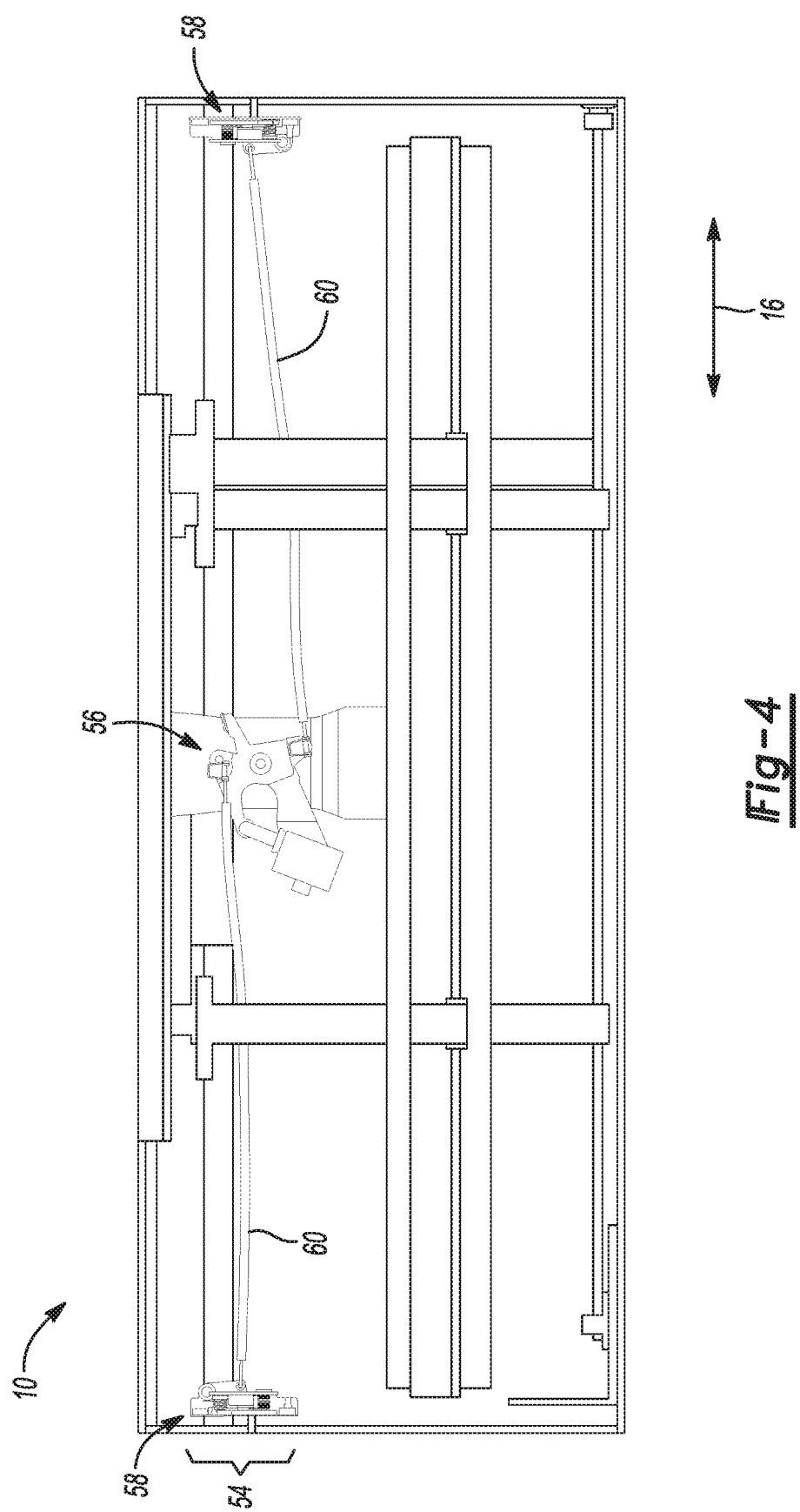
FIG. 4 is a rear cut-away view of the interior portion of the tailgate illustrating a latching system.

Referring to FIG. 4, a rear cut-away view of the interior portion of the tailgate 10, exposing a latching system 54 is illustrated. More specifically, the internal panel 18 and the access panel 34 have been removed to expose the latching system 54, which is disposed within the cavity 22. The latching system 54 may be exposed when the access panel 34 alone is removed. The latching system 54 includes a backside 56 of the door handle 26. The backside 56 of the door handle 26 may include a brain plate that is connected to at least one latch 58 by at least one connecting rod 60. When a user pulls on the door handle 26 the connecting rods 60 disengage the latches so that the tailgate 10 may be transitioned to an open position. The disclosure should not be limited to the latching system disclosed herein, but should be construed to include any latching system that may be used in a tailgate application. The latching system may include additional components not shown and/or described herein, including cams, springs, additional connecting rods, or any other mechanical linking device known in the art that is used to construct a latching system.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A tailgate comprising:
   internal and external panels secured to upper and lower panels, wherein a cavity is defined between the upper, lower, internal, and external panels, and wherein an upper-central portion of the internal panel that is adjacent to the upper panel defines an opening to the cavity;
   a latching mechanism disposed within the cavity, between the opening and a door handle, and adjacent to the opening;
   a one piece unitary integral access panel secured to the internal panel over the opening and latching mechanism, the access panel defined by an upper edge, a lower edge, a left edge, a right edge, a single substantially planar exterior surface, and a web, wherein the substantially planar exterior surface is perpendicular to the upper panel and spans an entire area that is between the upper edge, lower edge, left edge, and right edge of the access panel, and wherein the upper edge extends above the upper panel and the web extends from the access panel between the upper and lower edges and overhangs only a portion of the upper panel when the tailgate is in a closed position.

2. The tailgate of claim 1, wherein the access panel has a substantially flat interior surface that is perpendicular to the upper panel, the substantially flat interior surface extending over the upper-central portion of the internal panel.

3. The tailgate of claim 2, wherein the web extends from the substantially flat interior surface of the access panel, wherein the web is substantially perpendicular to the substantially flat interior surface of the access panel, and is secured to a top surface of the upper panel.

4. The tailgate of claim 1, further comprising a top cover that is secured to a top surface of the upper panel.

5. The tailgate of claim 4, wherein the access panel extends over the upper-central portion of the internal panel.

6. The tailgate of claim 5, wherein the web extends from an interior surface of the access panel, and wherein the web is substantially perpendicular to the substantially planar exterior surface of the access panel, and is sandwiched between the top cover and the top surface of the upper panel.

7. The tailgate of claim 1 further comprising a support member disposed within the cavity and secured to interior surfaces of the internal and external panels.

8. The tailgate of claim 1 further comprising fasteners that extend through the access panel and engage the internal panel to secure the access panel to the internal panel.

9. A tailgate comprising:
an internal panel secured to an upper panel at a substantially perpendicular angle, an upper-central portion of the internal panel defining an opening; and
a one piece unitary integral access panel secured to an outer surface of the internal panel and covering the opening, the access panel defined by an upper edge, a lower edge, a left edge, a right edge, a single substantially planar exterior surface, and a web, wherein the single substantially planar exterior surface is perpendicular to the upper panel and spans an entire area that is between the upper edge, lower edge, left edge, and right edge of the access panel, and wherein the upper edge extends above the upper panel and the web extends from the access panel between the upper and lower edges and overhangs only a portion of the upper panel when the tailgate is in a closed position.

10. The tailgate of claim 9, further comprising an external panel and a lower panel, wherein a cavity is defined between the upper, lower, internal, and external panels.

11. The tailgate of claim 10 further comprising a support member disposed within the cavity and secured to interior surfaces of the internal and external panels.

12. The tailgate of claim 9, wherein the access panel has a substantially flat interior surface that is perpendicular to the upper panel, the substantially flat interior surface extending over the upper-central portion of the internal panel.

13. The tailgate of claim 12, wherein the web extends from the substantially flat interior surface of the access panel, wherein the web is substantially perpendicular to the substantially flat interior of the access panel, and is secured to a top surface of the upper panel.

14. The tailgate of claim 9, further comprising a top cover that is secured to a top surface of the upper panel.

15. The tailgate of claim 14, wherein the access panel extends over the upper-central portion of the internal panel.

16. The tailgate of claim 9 further comprising fasteners that extend through the access panel and engage the internal panel to secure the access panel to the internal panel.

* * * * *